No. 805,112. PATENTED NOV. 21, 1905.
V. D. ANDERSON.
APPARATUS FOR EXTRACTING OIL.
APPLICATION FILED JUNE 23, 1905.
3 SHEETS—SHEET 1.
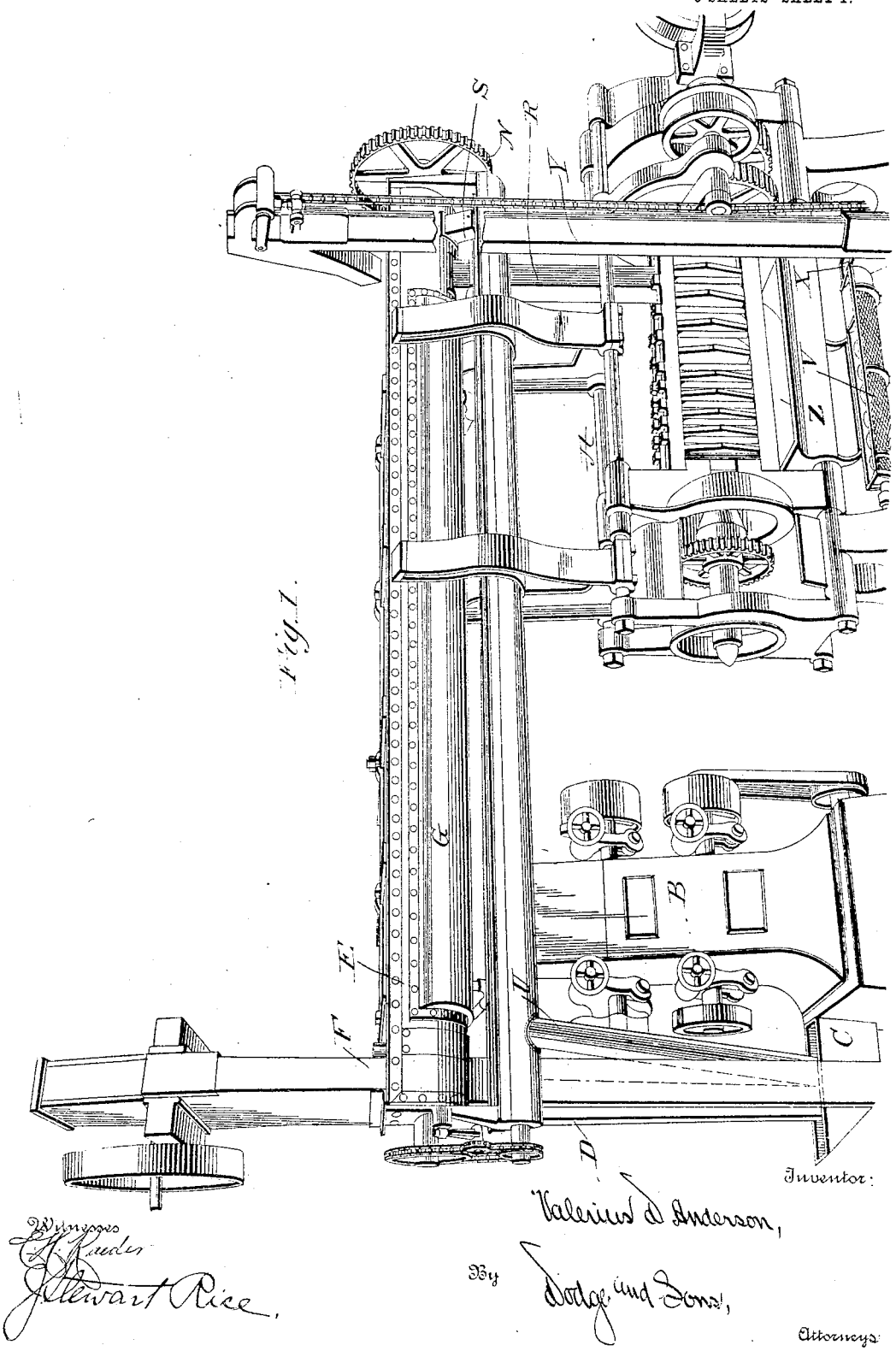

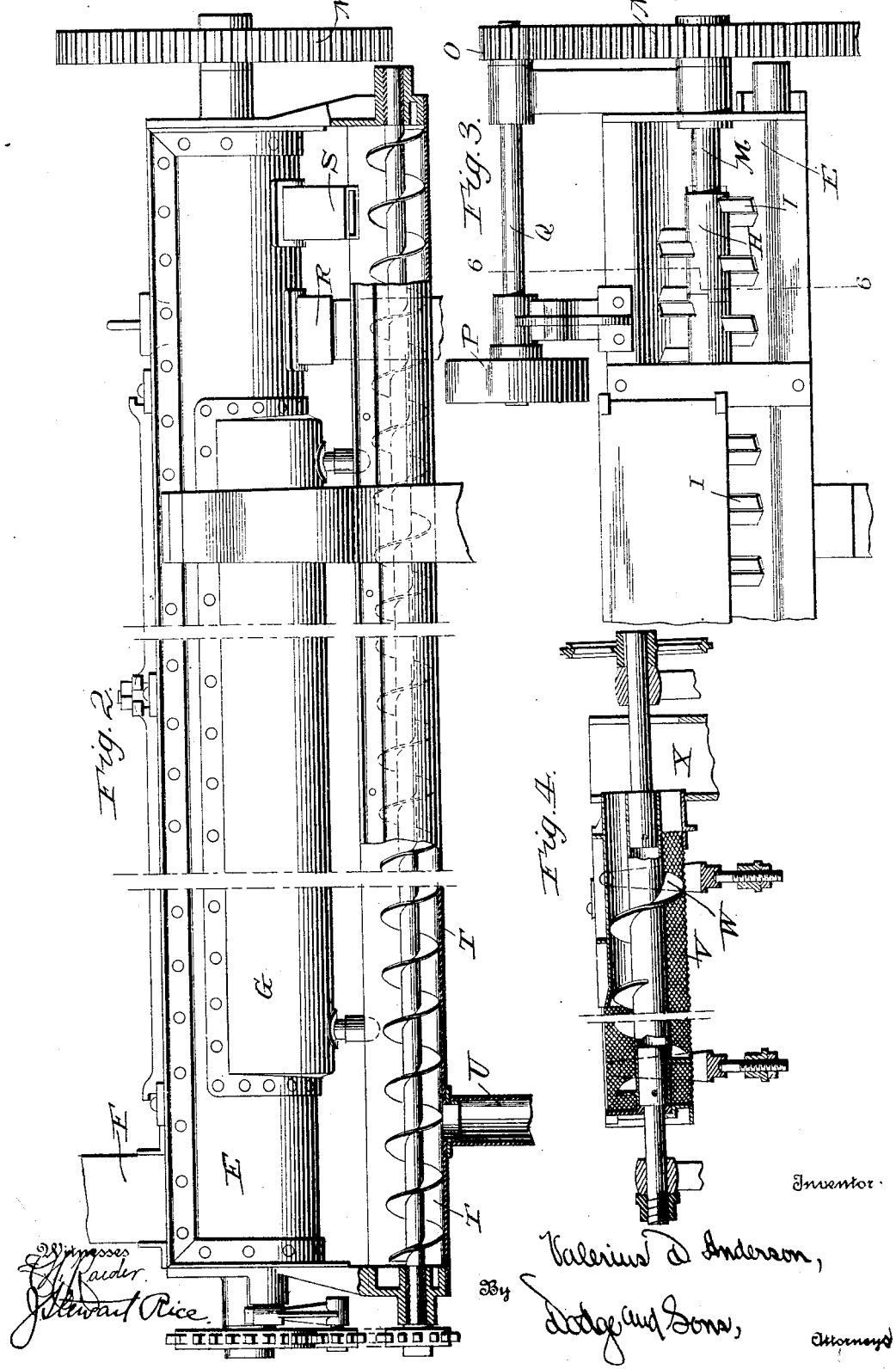

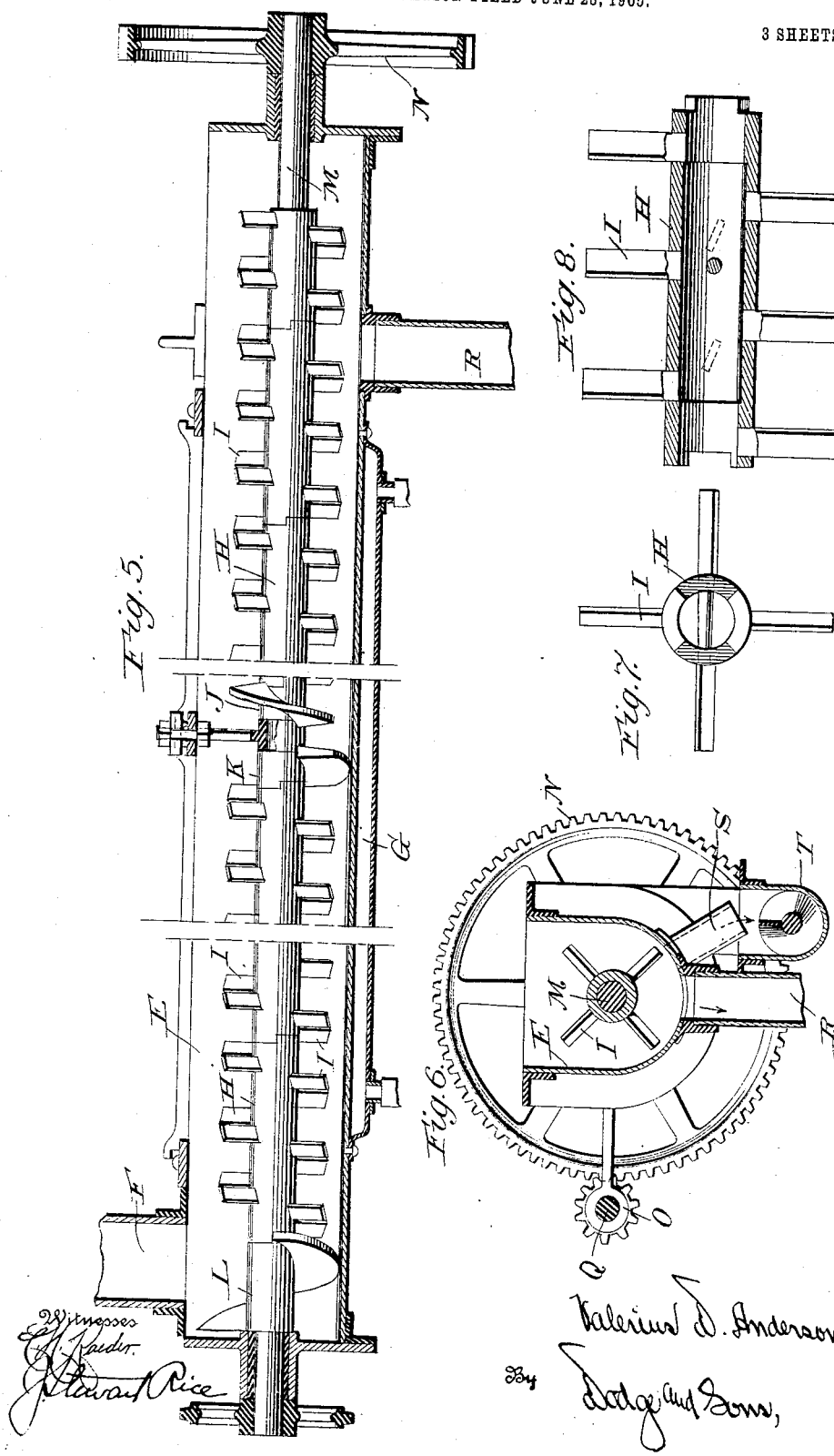

UNITED STATES PATENT OFFICE.

VALERIUS D. ANDERSON, OF CLEVELAND, OHIO.

APPARATUS FOR EXTRACTING OIL.

No. 805,112.          Specification of Letters Patent.          Patented Nov. 21, 1905.

Application filed June 23, 1905. Serial No. 266,631.

*To all whom it may concern:*

Be it known that I, VALERIUS D. ANDERSON, a citizen of the United States, residing at Cleveland, in the county of Cuyahoga and State of Ohio, have invented certain new and useful Improvements in Apparatus for Extracting Oil, of which the following is a specification.

My present invention pertains to an improved apparatus for extracting oil and the like from seeds and other oil-producing materials.

The apparatus is illustrated in the annexed drawings, wherein—

Figure 1 is a perspective view thereof; Fig. 2, a side elevation of the tempering-trough and the surplus-stock conveyer, the latter being shown as partly broken away; Fig. 3, a top plan view of the discharge end of the tempering-trough; Fig. 4, a longitudinal vertical sectional view of the oil-strainer and foots-separator; Fig. 5, a similar view of the tempering-trough; Fig. 6, a transverse vertical sectional view on the line 6 6 of Fig. 3; Fig. 7, an end elevation of one of the conveyer and agitator sections, and Fig. 8 a longitudinal sectional view of the same.

The main object of the present invention is to provide a heating or tempering apparatus in conjunction with a continuously-operating press, whereby the seed (either ground or whole, according to the nature thereof) may be heated before entering the press, the operation of the heater or tempering device and the press being continuous so long as the material is fed to the former.

A further object of the present invention is the production of an apparatus whereby the seed may be ground and then heated and while so heated fed to the press.

Another object is the provision of means for returning to the forward end of the tempering apparatus any overfeed which cannot be handled by the press at one operation of the same.

A still further object is to combine with the apparatus thus set forth a mechanism for effecting a separation of the foots from the oil which passes from the press and for returning such foots to the press to be again treated.

Referring to the drawings, A designates a press of any approved type, that illustrated forming the subject-matter of Letters Patent of the United States granted to me as follows: No. 647,354, dated April 10, 1900; No. 731,734, dated June 23, 1903; No. 731,735, dated June 23, 1903, and No. 731,737, dated June 23, 1903.

B denotes a grinding-mill located to one side of the press, the mill having a hopper C, into which the ground seed or meal is discharged. An endless conveyer D takes the meal from the hopper and discharges it into a tempering-trough E through a pipe or spout F, Figs. 1, 2, and 5. Said trough in the form shown is substantially U-shaped in cross-section and is surrounded throughout the major portion of its length by a steam-jacket G, to which steam at any desired pressure and temperature may be admitted. Extending lengthwise of the trough is a conveyer and agitator or mixer, said conveyer being preferably formed of a series of tubular sections H, carrying inclined radiating blades or stirrers I. These sections interlock with each other with intermediate screw-sections J K and with the primary feeding screw L. The tubular and screw sections are mounted on a shaft M, said shaft passing through suitable bearings at the ends of the trough and having secured to one end a large gear N, to which motion is imparted by a pinion O and power-wheel P, carried upon a counter-shaft Q.

A discharge-spout R leads from the tempering-trough into the head end of the press, the tempered meal being thereby passed directly from the trough to the press without any appreciable loss in heat and without the necessity of handling the same. The tempering-trough is also provided with a second spout S, Figs. 2 and 6, for use in case there should be an overfeed of stock or more than can be handled by the press at one time. Said spout discharges the surplus stock into a conveyer-trough T, the trough in turn being provided with a spout U, which carries the stock back to the hopper C, where it commingles with the freshly-ground meal and is again carried up to the tempering apparatus.

In order to effect as complete a separation of the oil as possible, I propose to employ a strainer for the oil as it passes from the press combined with means for returning the foots thus recovered to the press to be again treated. The strainer is shown in Figs. 1 and 4 and comprises a substantially U-shaped foraminous body V, in which works a screw W, the screw making a close fit against the strainer in order to keep the openings thereof clear and to move the solid matter into the boot X of an endless conveyer Y, which discharges the material into the tempering-trough. The oil passes into the strainer from a pan Z, located beneath the press. The particular arrangement and construction of the strainer forms a portion of the subject-matter of my copending application filed on or about the 23d day of June, 1905, Serial No. 266,630, and is therein claimed.

Certain oil-bearing materials—such, for instance, as corn-germs, peanuts, cotton-seed, and in some instances flax-seed—need not be ground. When these or like materials are to be pressed, they will be fed directly to the tempering apparatus and thence passed to the continuously-operating press.

The tempering device herein shown has been found particularly efficacious, inasmuch as the blades or stirrers I thereof tend to break up the material as well as to advance it along the tempering-trough. If a continuous screw be used, the material is simply advanced along the trough and but a small proportion thereof comes into direct contact with the heated surface. By the use of the arrangement shown and referred to above a relatively short trough may be employed.

Having thus described my invention, what I claim is—

1. In combination with a continuously-operating expelling-press, a tempering apparatus for the material to be treated, said apparatus discharging directly into the press.

2. In combination with a continuously-operating expelling-press, a tempering apparatus; and means contained within said tempering apparatus for agitating the material therein and feeding it to the press, substantially as described.

3. In combination with a continuously-operating expelling-press, a tempering-trough discharging into the press; and a series of agitators or stirrers mounted in said trough and serving to agitate the material therein and to advance it along the trough toward the discharge end thereof.

4. In combination with a continuously-operating expelling-press, a tempering-trough discharging into the press; means for heating said trough; a shaft extending through the trough; and a series of blades or stirrers carried by the shaft, said blades or stirrers serving to agitate the material and thereby bring it into intimate contact with the surface of the trough and also to advance the material along the trough toward the discharge end thereof.

5. In combination with an expelling-press, a grinding-mill; a tempering apparatus for the ground material; and means for effecting a feeding of the material from the mill, through the tempering apparatus and to the press.

6. In combination with an expelling-press, a grinding-mill; a tempering apparatus for the ground material; means for effecting a feeding of the ground material from the mill, through the tempering apparatus and to the press; and means for returning any overfeed.

7. In combination with an expelling-press, a grinding-mill; a hopper to receive the ground material from the mill; a tempering-trough discharging into the press; means for feeding the material from the hopper to the tempering-trough; and a conveyer adapted to receive any surplus material from the tempering-trough and to transfer it to the hopper.

8. In combination with an expelling-press, a grinding-mill; a hopper to receive the ground material from the mill; a tempering-trough; an endless conveyer serving to convey the material from the hopper to the tempering-trough; a spout leading from the tempering-trough to the press; a conveyer-trough discharging at one end into the hopper; and a second spout leading from the tempering-trough to said conveyer-trough.

9. In combination with an expelling-press, a grinding-mill; a tempering apparatus; means for effecting a feeding of the material from the mill, through the tempering apparatus and to the press; and means to separate the solid matter from the oil which passes from the press.

10. In combination with an expelling-press, a grinding-mill; a tempering apparatus; means for effecting a feeding of the material from the mill, through the tempering apparatus and to the press; means for effecting a separation of the solid matter from the oil as it passes from the press; and means for feeding such solid matter to the tempering apparatus.

11. In combination with an expelling-press, a grinding-mill; a tempering apparatus; means for effecting a feeding of the material from the mill, through the tempering apparatus and to the press; means for returning any overstock from the tempering apparatus to the mill; means for effecting a separation of the solid matter from the oil as it passes from the press; and means for feeding such solid matter to the tempering apparatus.

In testimony whereof I have signed my name to this specification in the presence of two subscribing witnesses.

VALERIUS D. ANDERSON.

Witnesses:
   C. W. TOLAND,
   F. B. ANDERSON.